3,393,175
BISAMIDES AS LIGHT STABILIZERS FOR
PIGMENTED POLYMERS
William Frederick Baitinger, Jr., Belle Mead, N.J., assignor to American Cyanamid Company, Stamford, Conn., a corporation of Maine
No Drawing. Filed Sept. 24, 1965, Ser. No. 490,073
5 Claims. (Cl. 260—41)

ABSTRACT OF THE DISCLOSURE

A light-stable polymeric composition comprising (a) a polymer selected from the group consisting of poly(vinyl chloride), polyolefins derived from olefins of 2–4 carbons and polystyrene; (b) at least 0.5% of $TiO_2$ pigment based on the weight of (a); and (c) 0.1–10.0% based on the weight of (a) of a compound of the formula:

wherein each R is independently alkyl of 0–18 carbons, alkenyl of 2–18 carbons, or N-substituted aminoalkyl of 1–18 carbons and Y is alkylene of 1–18 carbons; the substituents of the aminoalkyl radical being either loweralkyl, lower cyanoalkyl, lower hydroxyalkyl or lower alkoxy(lower-alkyl). The light-stable polymeric compositions can be shaped into various types of articles such as by molding, extrusion, or spinning.

---

This invention relates to an improved means for stabilizing pigmented polymers against deterioration by light. More particularly, it relates to the provision of $TiO_2$-pigmented polymers stabilized with certain diamides against light deterioration.

A variety of materials has been used for stabilizing polymers against discoloration by light. Ultraviolet adsorbers have been found to improve light stability to varying degrees. Certain substrates are more successfully treated with U.V. absorbers than others. For example, plasticized polymeric compositions respond to certain stabilizers more favorably than do the same polymers in unplasticized compositions; but unplasticized polymers may be stabilized by a combination of U.V. absorbers with certain non-absorbing compounds. In some cases, U.V. absorbers only may actually accelerate deterioration of the polymer. This is the case where a U.V. absorber per se is added to $TiO_2$-pigmented polymers such as rigid PVC. Thus, while there presently exists a wide array of light stabilizers, there are, nevertheless, many polymeric compositions, for example, pigmented polymers, for which adequate light stabilizing systems have not yet been provided. It is the object of the present invention to provide a new light stabilizer for $TiO_2$-pigmented polymers.

The present invention is based on the discovery that a class of compounds which are not per se light stabilizers, nonetheless act as light stabilizers for polymeric compositions which have been pigmented with titanium dioxide. The particular compounds are diamides represented by the following Formula I:

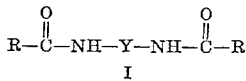
I wherein the R's are independently alkyl of 1–18 carbons, alkenyl of 2–18 carbons or N-substituted aminoalkyl of 1–18 carbons; and Y is alkylene (including alkylidene) of 1–18 carbons. The aminoalkyl group may be N-substituted with lower alkyl, lower cyanoalkyl, lower hydroxyalkyl, lower alkoxy(lower alkyl), and the like.

The amides which are useful in accordance with the present invention are typified by the following members:

N,N'-methylenebisacrylamide,
N-(stearamidomethyl)acrylamide,
ethylenebisstearamide,
N,N'-methylenebis(3-octadecylaminopropionamide),
N,N'-[1,1-isobutylidenebis(3-dimethylaminopropionamide)],
N,N'-ethylidenebis(acrylamide),
N,N'-ethylidenebis(acetamide),
N,N'-methylenebislauramide and
N,N'-methylenebis[3,3'-bis(dicyanoethylamino)propionamide].

The results obtained with the present invention are most surprising since the diamides alone in unpigmented polymers are not effective as light stabilizers. While titanium dioxide alone increases the light stability of various polymeric compositions, it was not expected that the addition of a diamide of the type herein disclosed which is ineffective in the unpigmented polymer, should result in vastly improved light stability of the pigmented polymeric compositions.

To improve the light stability of pigmented polymers, it would normally be expected that known ultraviolet absorbers could be used. It is now found that ultraviolet absorbers can be dispensed with in the case of pigmented polymers and that the diamides of the present invention, in spite of their ineffectiveness in unpigmented polymeric compositions, are new, useful and economical light stabilizers therefor.

The significance of the present invention is illustrated by the fact that conventional ultraviolet absorbers alone are not effective in stabilizing pigmented rigid poly(vinyl chloride) better than the pigment, titanium dioxide, alone. Moreover, in some instances, they actually may accelerate degradation. Therefore, the discovery of the synergistic combination of the diamides and titanium dioxide as light stabilizers for polymeric compositions is most surprising and very useful.

The pigmented polymers ordinarily encountered and to which the present invention applies, include polyvinylchloride, polystyrene and polyolefins such as polyethylene and polypropylene.

The polymeric compositions to be stabilized by the diamides of the present invention should contain at least 0.5% of titanium dioxide, which may be the rutile or anatase type, but, preferably, is the rutile type. The particle size range of the pigment is not particularly critical, but a practical particle size range is from 0.05 to 0.4 micron and preferably between about 0.15 and 0.3 micron. The concentration of titanium dioxide in the polymeric composition may range from 0.5 to 10.0% or more and, preferably, is above 0.5% based on the weight of the polymer. The concentration of the diamides described above may vary from about 0.1 to about 10.0% and preferably is from about 0.25 to about 3.0% based on the weight of the polymeric composition.

Other additives may be employed in preparing the final polymer for the intended application. Among such additives are fillers, antistatic agents, other pigments, dyes, lubricants, etc., and heat stabilizers.

The stabilized pigmented polymeric compositions of this invention have a wide variety of uses. They may be used effectively for various types of articles including molded products such as appliance cabinets, kitchen cabinets, soft drink cases, milk cases, packing frames, building construction materials, window frames, panels, outdoor siding, etc.; they may also be extruded to form films or filaments, the filaments being of use in fibers and fabrics for specialized uses as in bags, sails, etc.

The invention is further illustrated by the Examples which follow.

In the following examples, light stability was determined by preparation of polymeric compositions and exposure to natural light and artificial light in test equipment such as the FS–BL Unit (Flourescent Sunlamp-Blacklight Unit), the Fade-Ometer and the Sunshine Arc Weather-Ometer. The degree of degradation as shown by color formation is expressed by ΔYI (Yellow Index change). The FS–BL results are reported as the number of hours to reach a change in Yellow Index (ΔYI) of 15 Units. The Fade-Ometer data are reported as ΔYI after an indicated number of hours of exposure.

EXAMPLE 1

PVC samples were prepared from the following formulation:

| | Parts |
|---|---|
| Poly(vinyl chloride) | 100 |
| TiO$_2$ | 2 |
| Organo-tin-mercaptide heat stabilizer | 2 |
| Stearic acid | 0.5 |

Pre-blending of 100 gram quantities was accomplished by roll-mixing the above formulation overnight. Samples for exposure were prepared by adding a suitable quantity of additive, where desired, and milling on a two-roll laboratory mill for five minutes at 170° C., followed by compression-molding at 180° C. to give 50-mil plaques. Results obtained with various light stabilizers are given in the tables which follow.

ADDITIVES

A = N,N'-methylenebis(acrylamide)
B = N,N'-butylidenebis(acrylamide)
C = N-stearamidomethylene(acrylamide)

TABLE I.—FS–BL EXPOSURE OF TiO$_2$-PIGMENTED PVC CONTAINING VARIOUS STABILIZERS

| Additive | Initial Yellow Index | Time (Hrs.) to ΔYI=15 | Increase (Hrs.) In Exposure Time |
|---|---|---|---|
| Test No.: | | | |
| 1 None (control) | 2 | 390 | (¹) |
| 2 A (1%) | 3 | 940 | 550 |
| 3 B (1%) | 2 | 900 | 570 |
| 4 C (0.25%) | 2 | 520 | 130 |

¹ Control.

TABLE II.—WEATHER-OMETER EXPOSURE OF TiO$_2$-PIGMENTED PVC CONTAINING A STABILIZER

| Additive | Initial Yellow Index | ΔYI | |
|---|---|---|---|
| | | 200 Hours | 500 Hours |
| None (control) | 0 | 6 | 22 |
| A (1%) | 1 | 0 | 8 |
| A (2%) | 1 | 0 | 7 |

The FS–BL results show that the diamides used in the present invention in combination with titanium dioxide, as compared to the control, significantly increase the number of hours of exposure before a change of Yellow Index of 15 Units occurs. In many cases, the number of hours is doubled.

The Weather-Ometer results show that the diamides used in the present invention with titanium dioxide reduce the change in Yellow Index for a given exposure as compared to the control having titanium dioxide alone.

EXAMPLE 2

Samples prepared according to the procedure described in Example 1 were exposed six months in Arizona at a 45° angle facing south. Results indicating the extent of stabilization achieved with different additives appear in the following table.

TABLE III.—ARIZON EXRE APOSUOF TiO$_2$-PIGMENTED PVC

| Additive (Conc.) | Initial Yellow Index | ΔYI Arizona Six Months |
|---|---|---|
| None | 0 | 6 |
| A (1%) | 1 | 2 |
| A (2%) | 1 | 1 |

EXAMPLE 3

Polystyrene samples were prepared from the following formulation:

| | Parts |
|---|---|
| Polystyrene | 100 |
| TiO$_2$ | 2 |

Both the TiO$_2$ and additives were blended into the fused polymer on a two-roll laboratory mill at about 160° C. for three minutes. Samples were compression-molded into 50 mil plaques. Results obtained with various light stabilizers are given in the table which follows.

TABLE IV.—FADE-OMETER EXPOSURE OF TiO$_2$-PIGMENTED POLYSTYRENE

| Additive | Initial Yellow Factor | ΔYI Fade-Ometer | |
|---|---|---|---|
| | | 200 Hours | 500 Hour |
| Test No.: | | | |
| 1 None | 9 | 10 | 54 |
| 2 A (1%) | 8 | −3 | 19 |
| 3 A (2%) | 9 | −2 | 12 |
| 4 D ¹ (0.5%) | 15 | 15 | 39 |

¹ Additive D is 2-hydroxy-4-methoxybenzophenone, a conventional U.V. absorber.

EXAMPLE 4

PVC samples were prepared by a process similar to Example 1 except that the polymer contained 0.5% TiO$_2$ (instead of 2.0%), using the compound identified as "A" in Example 1 as the additive. The samples were exposed in a FS–BL Unit and the time in hours for a change in yellow index of 15 was recorded.

In addition, samples were exposed in Arizona sunshine and the change in yellow index was recorded after three months exposure. Results were as follows:

TABLE V.—PVC CONTAINING 0.5% TiO$_2$

| Additive | Time in Hours to ΔYI 15 in FS–BL | ΔYI After Three Months Exposure |
|---|---|---|
| Test No.: | | |
| 1 None (control) | 250 | 7 |
| 2 A (0.5%) | 330 | 2 |
| 3 D (0.5%) | 360 | 8 |

I claim:
1. A light-stable polymeric composition comprising (a) a polymer selected from the group consisting of poly (vinyl chloride), polyolefins derived from olefins of 2–4 carbons and polystyrene; (b) from about 0.5% to about 10.0% of TiO$_2$ pigment based on the weight of (a); and (c) 0.1–10% based on the weight of (a) of a compound of the formula:

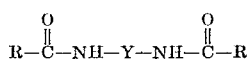

wherein each R is independently alkyl of 1–18 carbons, alkenyl of 2–18 carbons, or N-substituted aminoalkyl of 1–18 carbons, and Y is alkylene of 1–18 carbons; the substituents on the aminoalkyl radical being either lower alkyl, lower cyanoalkyl, lower hydroxyalkyl or lower alkoxy (lower alkyl).

2. The composition of claim 1 wherein the polymer is poly(vinyl chloride).

3. The composition of claim 1 wherein the compound is N,N'-methylenebis(acrylamide).

4. The composition of claim 1 wherein the compound is N,N'-butylidenebis(acrylamide).

5. The composition of claim 1 wherein the compound is N-stearamidomethylene(acrylamide).

No references cited.

ALLAN LIBERMAN, *Primary Examiner.*